(12) United States Patent
Devaux (10) Patent No.: US 12,139,382 B2
(45) Date of Patent: Nov. 12, 2024

(54) WEIGHING SYSTEM FOR A WORKING PLATFORM OF AN AERIAL LIFT HAVING A MAST

(71) Applicant: HAULOTTE GROUP, Lorette (FR)

(72) Inventor: Christian Devaux, Saint-Just-Saint-Rambert (FR)

(73) Assignee: HAULOTTE GROUP, L'Horme (FR)

( * ) Notice: Subject to any disclaimer, the term of this patent is extended or adjusted under 35 U.S.C. 154(b) by 877 days.

(21) Appl. No.: 17/286,941

(22) PCT Filed: Oct. 24, 2019

(86) PCT No.: PCT/IB2019/059125
§ 371 (c)(1),
(2) Date: Apr. 20, 2021

(87) PCT Pub. No.: WO2020/084561
PCT Pub. Date: Apr. 30, 2020

(65) Prior Publication Data
US 2021/0354967 A1    Nov. 18, 2021

(30) Foreign Application Priority Data

Oct. 26, 2018  (FR) ...................................... 1859975
Oct. 29, 2018  (FR) ...................................... 1860021

(51) Int. Cl.
*B66F 17/00*  (2006.01)
*B66F 11/04*  (2006.01)
*G01G 19/08*  (2006.01)

(52) U.S. Cl.
CPC .......... *B66F 17/006* (2013.01); *B66F 11/046* (2013.01); *G01G 19/08* (2013.01)

(58) Field of Classification Search
CPC ........ B66F 17/006; B66F 11/00; B66F 11/04; B66F 11/042; B66F 11/044; B66F 11/046
See application file for complete search history.

(56) References Cited

U.S. PATENT DOCUMENTS 6,585,079 B1 *  7/2003  Weyer ................... B66F 9/0655
                                                       182/2.7
6,842,118 B2 *  1/2005  Igarashi ................ B66F 17/006
                                                       340/685
(Continued)

FOREIGN PATENT DOCUMENTS

CN        106006504 A       10/2016
CN        106430020 A        2/2017
(Continued)

OTHER PUBLICATIONS

JLG Operation & Safety, Service & Maintenance & Illustrated Parts Manual Supplement, JLG Load Sensing System, Boom Lift Products, P/N 3124287, Jul. 24, 2013.

*Primary Examiner* — Colleen M Chavchavadze
(74) *Attorney, Agent, or Firm* — 24IP Law Group USA, PLLC; Timothy R DeWitt (57) ABSTRACT

The aerial lift comprises a working platform 130 and a lifting structure 120 supporting the platform 130 on one side. At least three, preferably four, force sensors 41, 42 are interposed between the lifting structure 120 and the platform 130. The support interfaces for the force sensors 41, 42 are all situated on a side of the floor 131 of the platform 130 that is situated towards the side of the working platform on which it is supported by the lifting structure 120. Each of the force sensors 41, 42 is provided to measure the force exerted only in the vertical direction by the platform 130 on the support interface thereof when the floor of the working platform extends horizontally.

17 Claims, 4 Drawing Sheets

(56) References Cited

U.S. PATENT DOCUMENTS

| | | | | |
|---|---|---|---|---|
| 7,004,285 B2 * | 2/2006 | Bailey | ............... | B66F 11/046 |
| | | | | 182/2.1 |
| 9,249,004 B2 * | 2/2016 | Bowden | ............... | G01G 3/145 |
| 10,495,529 B2 * | 12/2019 | Lipowski | ............... | G01L 1/246 |
| 10,618,786 B2 * | 4/2020 | Parot | ............... | B66F 17/006 |
| 2004/0045768 A1 | 3/2004 | Bafile et al. | | |
| 2006/0045713 A1 * | 3/2006 | Magni | ............... | B66F 17/006 |
| | | | | 414/687 |
| 2019/0195705 A1 | 6/2019 | Addleman et al. | | |

FOREIGN PATENT DOCUMENTS

| | | | | |
|---|---|---|---|---|
| EP | 1153880 B1 | 11/2001 | | |
| EP | 1382562 A1 | 7/2003 | | |
| JP | 2004043121 A | * 2/2004 | ............. | B66F 11/04 |
| JP | 2017088306 A | 5/2017 | | |
| WO | 9911557 A1 | 3/1999 | | |
| WO | 2017177219 A1 | 10/2017 | | |

\* cited by examiner

WEIGHING SYSTEM FOR A WORKING PLATFORM OF AN AERIAL LIFT HAVING A MAST

BACKGROUND OF THE INVENTION

Field of the Invention

The present invention concerns the field of mobile elevating working platforms (also designated by its abbreviation MEWP), also commonly called aerial work platforms (or its abbreviation AWP). It concerns in particular aerial work platforms that include a mast supporting the working platform of the aerial work platform.

Brief Description of the Related Art

Aerial work platforms are machines designed to allow one or more people to work at height. For this purpose, they include a working platform designed to receive people. The working platform is supported by an elevating structure that allows it to be raised from a lowered position on the chassis of the aerial work platform to the desired working position at height. The elevating structure is often arranged on a turret that is pivotally mounted on the chassis, allowing the orientation of the lifting mechanism—and thus the platform—to be changed relative to the chassis. Finally, the chassis is usually equipped with wheels or tracks to move the aerial work platform on the ground. It is usually motorised to allow the aerial work platform to move independently on the ground. The working platform is usually equipped with a control station that allows an operator on board the platform to move it to the desired working position.

Each model of aerial work platform is designed to support a maximum load that must not be exceeded in order to avoid the risk of accidents, for example to prevent the aerial work platform from tipping over. Therefore, it is desirable to equip the aerial work platform with a weighing system to determine the load on board the aerial work platform in order to limit or prevent the lifting of the platform or the movement of the aerial work platform on the ground. Contemporary normative developments make it mandatory for certain categories of aerial work platforms to be fitted with such a weighing system and impose a certain degree of accuracy in the measurement performed.

Today, it appears that there is no satisfactory weighing system for vertical mast aerial work platforms, especially those of the type directly supporting the working platform.

A vertical mast aerial work platform is an aerial work platform whose elevating structure comprises a fixed vertical mast that supports the working platform, i.e., the mast extends vertically in relation to the chassis without the possibility of changing its angle in relation to the chassis. The mast is vertically extensible generally by means of a plurality of boxes that fit together and slide vertically between them. They usually weigh between 800 and 1,200 kg and have a maximum lifting height of around 6 to 10 m.

In the case of vertical mast aerial work platforms directly supporting the working platform, the latter is mounted directly to the last box of the vertical mast, which the working platform usually partially surrounds, in contrast to vertical mast aerial work platforms supporting the working platform by means of a pendulum arm mounted at one end to the last box of the vertical mast and supporting the working platform at its other end.

For vertical mast aerial work platforms, it is possible to estimate the load by measuring the pressure in the mast lift cylinder. However, the measuring accuracy is poor due to friction between the mast boxes and also due to the use of a multi-body lifting cylinder, i.e., one that actually corresponds to several cylinders connected to each other and for which it turns out that the pressure evolution in the different cylinders is different from one cylinder to another and varies, for example, according to the location of the load on the working platform.

To date, load weighing systems on board the working platform have been developed primarily for aerial work platforms with a telescopic mast that can be tilted in relation to the chassis. This type of aerial work platform usually weighs between 6 and 22 tons with a maximum lifting height usually between 12 and 42 m.

A first approach consists in supporting the working platform by means of four force sensors mounted on a rigid frame and positioned near the corners of the working platform, the rigid frame being supported by the elevating structure. This approach is illustrated for example by CN 106006504 A. However, such a rigid chassis has a significant mass, which makes this solution poorly suitable for light machines such as a vertical mast aerial work platform, especially due to the increased risk of tipping. Furthermore, in CN 106006504 A, the guardrail is mounted directly on the rigid frame so that the weighing system does not take into account any loads that may be hooked or placed by users on the guardrail.

In a second approach, a weighing system is positioned laterally between the platform and the elevating structure. It comprises a mechanical device through which the elevating structure supports the working platform and to which a force sensor is associated. The mechanical device is designed to decouple the weight of the working platform and the moments resulting from the cantilevered positioning of the working platform so that the force sensor is subjected exclusively to the weight of the working platform and therefore measures only the latter. This approach is disclosed by EP 1 382 562 B1 where the mechanical device is a metal test body with a strain gauge-based force sensor. It is also disclosed by WO 2017/177219 where the mechanical device is in the form of an articulated parallelogram.

These second approach systems are unsuitable for use in vertical mast aerial work platforms, and even less so in those of the type where the vertical mast directly supports the working platform.

This is because the mechanical device is heavy, which makes these weighing systems poorly suitable for light machines such as a vertical mast aerial work platform, especially due to the increased risk of tipping.

In addition, the lateral placement of the weighing system between the elevating structure and the working platform is not easily adaptable to a vertical mast aerial work platform directly supporting the working platform because the vertical mast supports the working platform from below.

However, even if the weighing system is to be installed under the working platform, as is the case of EP 1 382 562 B1, the large size of the mechanical device has the disadvantage of increasing the size of the aerial work platform, especially its height in the lowered state, which is detrimental both to the transport of the aerial work platform and to the ease of access of the user to the working platform.

This second approach is also proposed by CN 106430020 A in a simpler version in which the mechanical device consists of two frames pushed by springs arranged between them and a mechanical position switch operating on an on-off basis and activated by one of the frames when a threshold is exceeded. However, this system has all the above disadvantages while it is less accurate, presents a risk of seizure and does not allow continuous measurement of the load on board the working platform.

There is therefore a need for a load weighing system on board the working platform that is better suited for use in vertical mast aerial work platforms, especially those of the type where the vertical mast directly supports the working platform.

SUMMARY OF THE INVENTION

The purpose of the present invention is to provide weighing technology for aerial work platforms which is better suited for implementation in vertical mast aerial work platforms, but which may potentially also be used for other types of aerial work platforms. For this purpose, the present invention provides an aerial work platform, comprising:
- a working platform comprising a floor and a guardrail,
- an elevating structure for moving the working platform in height, the elevating structure comprising an extensible mast via which the working platform is supported, the elevating structure supporting the working platform only by one side of the working platform, and
- at least three force sensors interposed between the elevating structure and the working platform via which the elevating structure fully supports the weight of the working platform, wherein:
- the force sensors are arranged in a fixed spatial relationship to each other,
- the force sensors are arranged so that, in orthogonal projection on a plane corresponding to the floor of the working platform, the force sensors are all located on the same side of a median line of the floor of the working platform which is the one located towards the side of the working platform by which it is supported by the elevating structure,
- each force sensor is adapted to measure the force exerted on it only in the vertical direction by the working platform when the working platform floor extends horizontally. In other words, each force sensor is designed to measure the force exerted on it only in the direction perpendicular to the floor of the working platform.

In the invention, the working platform is therefore cantilevered with respect to the elevating structure and the force sensors. The force sensors are therefore subjected both to the weight of the working platform, including the load on board, and to the forces resulting from the moments that occur due to cantilevered mounting, unlike the first and second approach of the prior art where the one or more force sensors are subjected only to the weight. However, since the force sensors are designed to measure the force exerted on them only in the vertical direction by the working platform when the floor of the working platform extends horizontally, the weight of the working platform, including the load on board, can nevertheless be easily determined with satisfactory accuracy by adding up the algebraic measurements provided by the force sensors. It will be understood that the force sensors are interposed between the elevating structure and the working platform by being spatially distributed in such a way that each is subjected to an own effort by the working platform.

The invention is advantageous compared to the prior art for several reasons. Compared to the first approach of the prior art, the force sensors occupy a much smaller area which is located on the side of the working platform through which it is supported. As a result, the force sensors can be supported by a smaller, and therefore also lighter structure.

Compared to the second approach, the invention avoids having to use a heavy and bulky mechanical device to dissociate the weight of the working platform and the moments resulting from its cantilevered mounting in order to subject the force sensor only to the weight.

According to preferred embodiments, the invention comprises one or more of the following features:
- the force sensors each have their own support interface for supporting the working platform or for being supported by the elevating structure, and each of the force sensors is designed to measure the force exerted solely in the vertical direction by the working platform on its support interface when the floor of the working platform extends horizontally or to measure the force exerted solely in the vertical direction by its support interface on the elevating structure when the floor of the working platform extends horizontally; in particular, it may be provided that the force sensors each have their own support interface for supporting the working platform, each of the force sensors being provided for measuring the force exerted solely in the vertical direction by the working platform on its support interface when the floor of the working platform extends horizontally;
- the force sensors are distributed in such a way that, in an orthogonal projection on a plane, the support interfaces occupy the vertices of a polygon;
- the elevating structure supports the working platform from the middle of one side of the working platform and the force sensors or force sensor support interfaces are arranged symmetrically with respect to a median plane of the floor of the working platform which is perpendicular to said median line;
- the support interface of each force sensor comprises a planar support surface, the planar support surfaces of the support interfaces of the force sensors being coplanar;
- the support interface of each force sensor comprises a planar support surface extending parallel to the floor of the working platform or the support interface of each force sensor comprises a planar support surface extending perpendicularly to the floor of the working platform;
- the force sensors are arranged under the floor or, viewed in orthogonal projection on a plane corresponding to the floor of the working platform, the force sensors are arranged outside the floor;
- at least two of the force sensors are based on strain gauges arranged on or in a common test body, the support interface of each of these two sensors being part of the common test body;
- the common test body has a bar shape comprising two opposite longitudinal ends, the supporting interface of one of the two force sensors being arranged in a region towards one of the longitudinal ends and the supporting interface of the other of the two force sensors being arranged in a region towards the other longitudinal end;
- the force sensors are four in number;
- the supporting interfaces of the four force sensors are arranged, in orthogonal projection on a plane, along the vertices of a square, rectangle or isosceles trapezium;
- two of the force sensors are based on strain gauges arranged on or in a common first bar-shaped test body, the support interface of each of these two sensors being part of the first test body, and the other two force sensors are based on strain gauges arranged on or in a common second test body separate from the first test body, the support interfaces of each of these other two sensors being part of the second test body;

the extensible mast is a vertical fixed mast, the mast being extensible by means of a plurality of boxes which fit together and slide between them in vertical direction, the mast supporting the working platform via the upper box to which the working platform is rigidly mounted via the force sensors;

the upper part of the guardrail is in sliding contact against the vertical wall of the upper box to support the working platform;

the upper box of the mast has projecting supports on at least two opposite sides of the box, the force sensors being fixed on said supports;

the first test body is fixed on one of the supports and the second test body is fixed on the other support;

said supports are horizontal, the first and second test bodies being placed between the floor of the working platform and the corresponding horizontal support of the upper box by lying horizontally between them;

the extensible mast is a vertical fixed mast, the mast being extensible by means of a plurality of boxes which fit together and slide vertically between them, the mast supporting the working platform via the upper box, the elevating structure further comprising a pendulum arm, one end of which is articulated to the upper box of the vertical fixed mast and an opposite end supports the working platform; or the extensible mast is a mast tiltable with respect to a chassis supporting the elevating structure, the mast optionally comprising sections articulated to each other.

the elevating structure supports the working platform by a narrow side of the working platform;

the aerial work platform further comprises an electronic processing device for determining the load placed on the platform from the force measurements provided by the force sensors.

BRIEF DESCRIPTION OF THE DRAWINGS

Other features and advantages of the invention will appear on reading the following description of a preferred embodiment of the invention, given as an example and with reference to the appended drawing.

DETAILED DESCRIPTION OF THE INVENTION

With reference to FIGS. 1 to 6, we will now describe an aerial work platform 1 according to a first embodiment.

Figures 1, 2, 3:
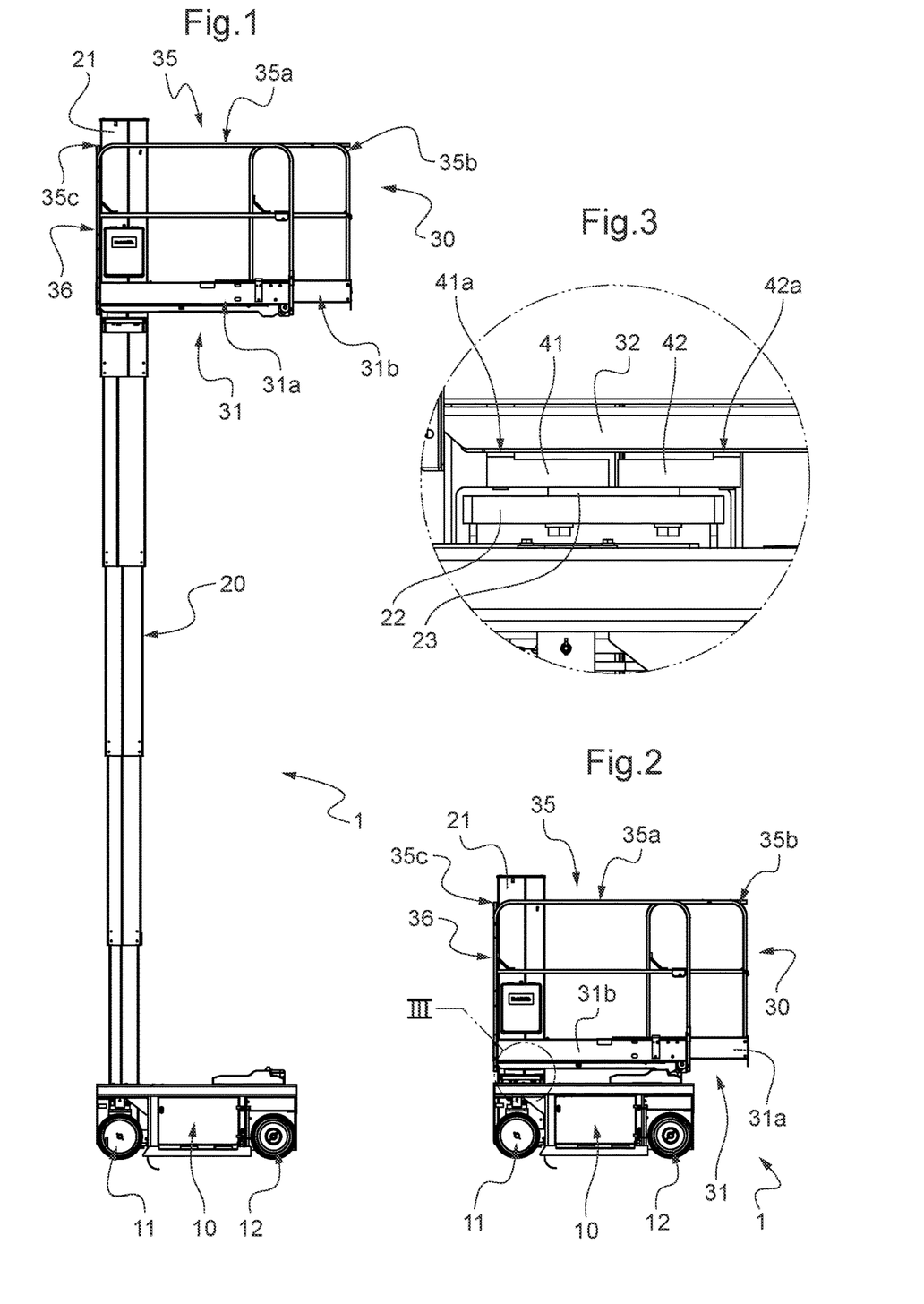
FIG. 1 shows a view of a vertical mast aerial work platform according to an embodiment of the invention, the vertical mast being extended to the maximum.
FIG. 2 shows another view of the aerial work platform from FIG. 1, the vertical mast being retracted to its maximum.
FIG. 3 shows a detailed view of the weighing system of the aerial work platform according to the first embodiment, which corresponds to the area referenced III in FIG. 2.

Aerial work platform 1 is an aerial work platform with a vertical fixed mast 20 forming the elevating structure of aerial work platform 1, it being understood that mast 20 is indeed vertical when the aerial work platform is placed on a flat horizontal ground. Mast is vertically extensible by means of a plurality of boxes which fit together and slide vertically between them under the action of a multi-body cylinder.

Aerial work platform 1 comprises a chassis 10 on which mast 20 is rigidly mounted, i.e., it cannot rotate in relation to chassis 10, nor can its inclination be changed in relation to chassis 10. Chassis 10 includes wheels 11, 12—or alternatively tracks—for moving the aerial work platform 1 on the ground. Chassis 10 is preferably motorised to allow the autonomous movement of aerial work platform 1 on the ground.

Aerial work platform 1 comprises a working platform 30 which is rigidly supported by mast 20, i.e., working platform 30 cannot be moved in relation to mast 20. For this purpose, working platform 30 is rigidly mounted to the last box 21 of vertical mast 20, i.e., the highest box when mast 20 is extended. Working platform 30 comprises a floor 31 and a guardrail 35. Floor 31 extends perpendicularly to mast 20, i.e., floor 31 is horizontal when aerial work platform 1 is resting on a flat horizontal ground.

Figure 5:
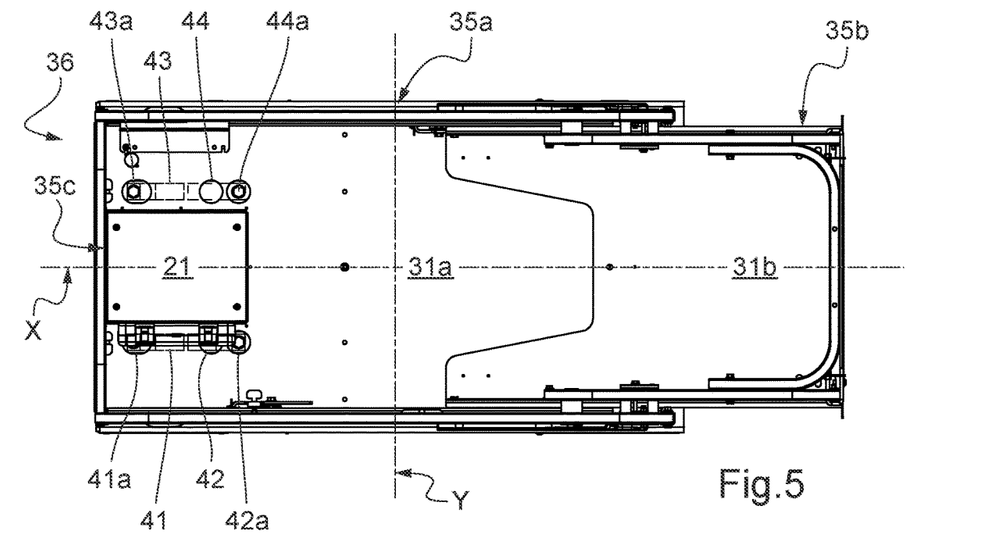
FIG. 5 is a top view of the working platform of the aerial work platform of the first embodiment, which shows the layout of the force sensor support interfaces of the weighing system.

Working platform 30 has a generally rectangular base plane—see FIG. 5—which corresponds substantially to the base plane of chassis 10. Mast 20 supports working platform 30 from the middle of a narrow side 36 of the latter which conventionally defines the rear side of aerial work platform 1. Box 21 is surrounded on both sides and the front side by working platform 30, while the rear side of box 21 is substantially aligned with the rear side of working platform 30.

Aerial work platform 1 is equipped with a weighing system to determine the load on the working platform 30. It comprises four force sensors 41, 42, 43, 44 which are mounted between box 21 and working platform 30 so as to fully support the weight of working platform 30.

More precisely, force sensors 41 to 44 are arranged in pairs on either side of box 21. Thus, force sensors 41, 42 are arranged on a first lateral side of box 21 and force sensors 43, 44 are arranged on a second lateral side of box 21 opposite to the first.

A first horizontal support 22 is protruding on the first lateral side of box 21 for mounting force sensors 41, 42. It can be a casting part added to box 21, for example by welding. Horizontal support 22 comprises an upper surface 23 to which force sensors 41, 42 are attached by any appropriate means such as screws. Surface 23 is preferentially machined to provide good positioning of force sensors 41, 42. A second horizontal support—not visible in the figures—similar to the first one is arranged on the second lateral side of box 21 for mounting force sensors 43, 44.

Force sensors 41 to 44 are placed under floor 31 of the working platform 30 so as to support working platform 30 by its floor 31. Each of force sensors 41, 42, 43, 44 has a respective support interface 41a, 42a, 43a, 44a via which they support floor 31 of working platform 30. In this case, a beam 32 of the structure forming floor 31 is attached—by screws or other suitable means—to support interfaces 41a, respectively 42a, of force sensors 41, respectively 42. Similarly, another—not visible—beam of the structure forming floor 31 is attached to support interfaces 43a, respectively 44a, of force sensors 43, respectively 44.

As can be seen in FIG. 5, support interfaces 41a to 44a and more generally force sensors 41 to 44 are arranged symmetrically with respect to a vertical median plane X of floor 31 of working platform 30, see FIG. 5. Such an arrangement facilitates the positioning of force sensors 41 to 44 with respect to the elevating structure and favourably distributes the forces exerted by the working platform on support interfaces 41a to 44a of force sensors 41 to 44, taking into account the fact that the elevating structure supports working platform 30 from the middle of one side of the latter through which median plane X passes. This allows identical dimensioning of force sensors 41 and 42 with respect to force sensors 43 and 44, which are arranged on either side of the median plane. This also helps to improve the accuracy of the load determination made from the measurement of force sensors 41 to 44.

Viewed in orthogonal projection on a plane corresponding to floor 31, force sensors 41a to 44a are all arranged on the side of the transverse median line Y of floor 31 which is the side towards narrow side 36 through which mast 20 supports working platform 30, i.e., to the left of transverse median line Y of floor 31 in FIG. 5. As a result, working platform is cantilevered with respect to force sensors 41 to 44 and their supporting interfaces 41a to 44a.

In this case, the four support interfaces 41a, 42a, 43a, 44a are arranged, in orthogonal projection on the plane corresponding to floor 31, in accordance with the vertices of a rectangle or even a square, as can be seen in FIG. 5. The positioning of support interfaces 41a to 44a in accordance with the vertices of a rectangle or square is convenient due to the rectangular cross-section of the mast boxes 20, in particular box 21 on either side of which force sensors 41 to 44 are mounted. However, support interfaces 41a to 44a may also be arranged at the vertices of a polygon other than a rectangle or square, for example those of an isosceles trapezium. The fact that support interfaces 41a to 44a of force sensors 41 to 44 occupy the vertices of a polygon in orthogonal projection on a plane, provides a spatial distribution of these interfaces which provides effective stable support for working platform 30. In this case, working platform 30 is of the extensible type, i.e., floor 31 comprises a fixed part 31a which is rigidly mounted on force sensors 41 to 44 and a sliding part 31b which is sliding with respect to fixed part 31a so that the length of working platform 30 can be varied. Similarly, guardrail 35 consists of a fixed part mounted on fixed part 31a of floor 31 and a sliding part 35b fixedly mounted on sliding part 31b of floor 31. It will be understood that the reference to transverse median line Y of floor 31 is defined in the situation where sliding part 31b is retracted to its maximum, i.e., where the length of working platform 30 is minimal.

In this first embodiment, support interfaces 41a to 44a each comprise a flat surface parallel to floor 31—i.e., horizontal like floor 31—and are coplanar, which has the advantage of compactness and simplicity of mounting the force sensors. Alternatively, the support interfaces can be located in different horizontal planes.

Each of force sensors 41 to 44 is capable of providing a measure of the force exerted perpendicularly to the flat surface of its support interface 41a to 44a.

Figure 4:
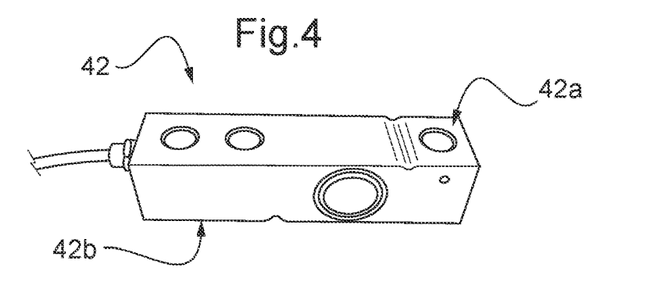
FIG. 4 shows one of the force sensors of the aerial work platform weighing system of the first embodiment.

Force sensors 41 to 44 are strain gage sensors, each comprising a respective test body in bar form. The test body is generally stressed in bending for this type of sensor. An example configuration for force sensor 42 is shown in FIG. 4. In this case, support interface 42a, on the upper side of the bar, comprises the horizontal flat surface already mentioned and a hole for securing beam 32 of floor 31 to the horizontal flat surface by means of a screw or bolt. The underside of the bar has a surface forming a mounting interface 42b with two through holes for positioning and fixing to horizontal support 22 of box 21. Force sensors 41, 43 and 44 can be identical to force sensor 42.

As can be seen in FIG. 3, the force sensors are placed between beam 32 of floor 31 of working platform 30 and the corresponding horizontal support 22 of box 21 lying horizontally between them.

The use of strain gauge sensors with a test body in the form of a bar is advantageous because this type of sensor is commonly available commercially and is economical while providing good accuracy. In addition, they have limited space in the transverse direction of the bar, which limits the increase of the level of floor 31 with respect to chassis 10 in the lowered state of working platform 30.

In addition, as can be seen in FIG. 3, the configuration of horizontal supports 22 of box 21 and of the beams of the structure of floor 31, which are used to mount force sensors 41 to 44, advantageously allows direct mounting between them without force sensors 41 to 44 in the event that it is not desired to equip aerial work platform 1 with a platform load determination system. This can be contemplated, for example, in the case of an aerial work platform 1 with a small working platform 30, which can therefore escape the normative requirement to be equipped with a weighing system.

Alternatively, any other type of suitable force sensors can be used, such as compression sensors or sensors with S-shaped test bodies, the latter being bulkier, or electromagnetically compensated sensors which are however more expensive.

Sensors 41 to 44 may be either analog sensors, i.e., without integrated electronics, or digital sensors, i.e., with electronics integrated in the test body for conditioning the signals of the measuring cell formed by the strain gages. In both cases, the sensors include an electrical or other link to output the sensor measurement signals to the on-board electronics of the aerial work platform 1.

The on-board electronics of aerial work platform 1 calculates the load on board working platform 31 from the sum of the algebraic measurements of the four force sensors 41 to 44, which corresponds substantially to the total weight of the loaded working platform 30. This is because the sum of the algebraic measurements of the four force sensors 41 to 44 corresponds substantially to the weight despite the cantilevered mounting, and thus because force sensors 41 to 44 do not only "see" the weight of the loaded working platform 30, but also the forces resulting from the moments related to the weight of working platform 30. This is due to the fact that each force sensor 41 to 44 measures only the force exerted on its support interface in the vertical direction when the aerial work platform is placed on a substantially horizontal ground, which is the usual condition of use of such an aerial work platform.

Figure 6:
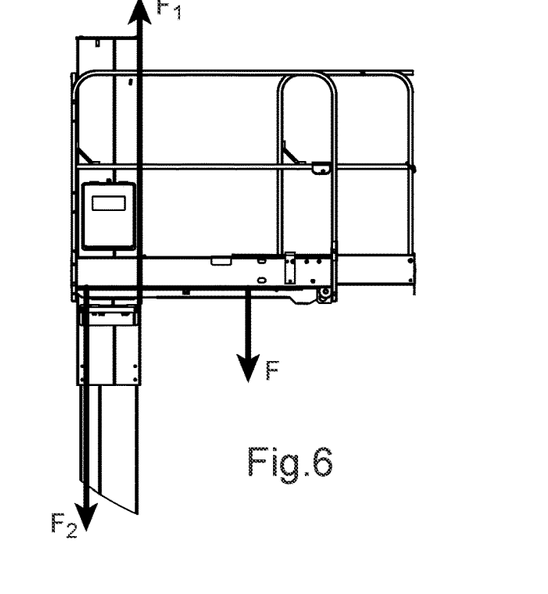
FIG. 6 illustrates the forces measured by the force sensors for a loading case of the working platform of the aerial work platform of the first embodiment.

An example of a measurement is shown in FIG. 6 where the weight of the loaded working platform 30 is noted F and is applied to the centre of floor 31. Due to the cantilevered mounting of working platform 30, force sensors 41, 43 on the one hand and force sensors 42, 44 on the other hand are loaded in opposite directions, i.e., in tension for the former and in compression for the latter.

In this example, force sensors 41, 43 are subjected together to a vertical load $F_2$, each supporting half of it because the weight F is centred in this case. Similarly, force sensors 42, 44 are subjected together to a vertical force $F_1$ which is directed in the opposite direction of the force $F_2$, each supporting half of it. The algebraic sum $F_1+F_2$ corresponds substantially to the weight F according to the laws of statics.

In addition, it can be provided that the rear upper part 35c of fixed part 35a of guardrail 35 is in sliding contact with box 21 so as to support working platform 30, and thus limit its bending due to its cantilevered mounting. This makes it advantageous to adopt a less rigid structure for floor 31, and therefore less heavy. The sliding contact avoids disturbing the load determination of working platform 30 from the measurements of force sensors 41 to 44, since force sensors 41 to 44 bear substantially the entire weight of the loaded working platform 30 despite this sliding contact.

The on-board electronics of aerial work platform 1 is provided to be able to implement a calibration procedure so that the load on board the working platform 30 can be determined. Then, in use, the on-board electronics can be provided to inhibit the lifting of the working platform 30 or limit its lifting speed depending on the importance of the load on board the working platform 30, which it determines on the basis of the signals received from force sensors 41 to 44. In particular, it may be provided to inhibit the lifting of working platform 30 if the load exceeds a first predetermined threshold. It may be provided to limit the lifting speed of working platform 30 if the load exceeds a second predetermined threshold lower than the first. Alternatively, a display can be provided on the control panel on board working platform 30 which indicates the load level, for example in the form of a bar graph.

Figure 7:
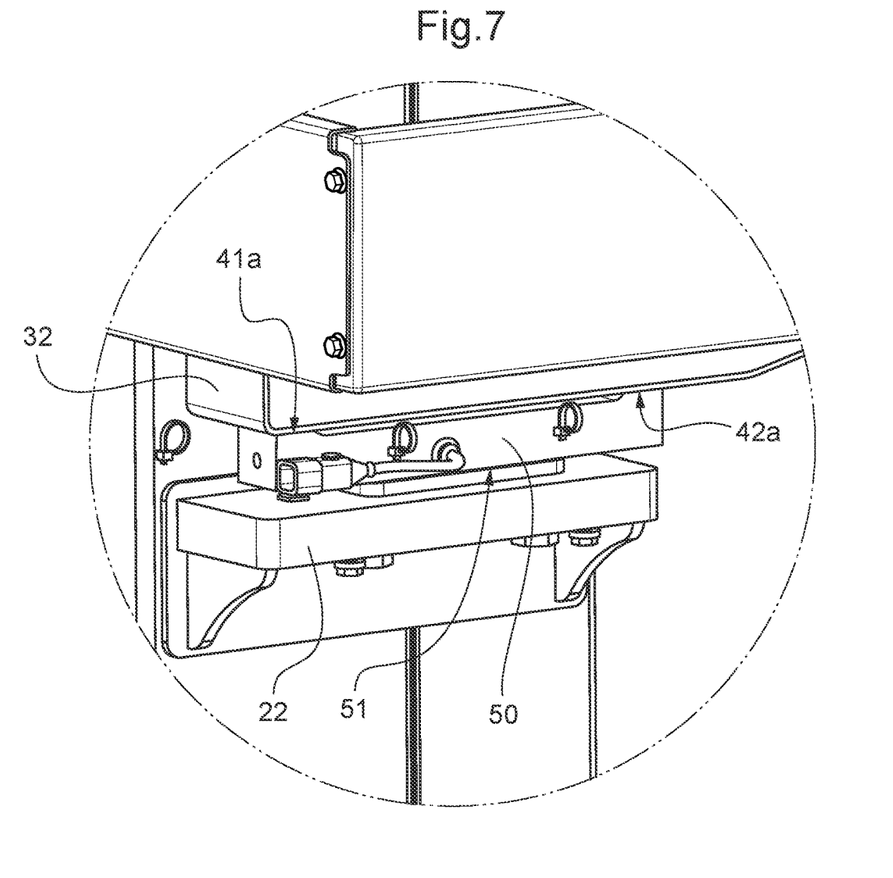
FIG. 7 shows a view similar to FIG. 3, but for a variant of the first embodiment in which the two force sensors share the same test body so as to form a dual sensor.

FIG. 7 illustrates a variant of the first embodiment in which force sensors 41, 42 have the same first test body in the form of a bar and force sensors 43, 44 have the same second test body in the form of a bar separate from the first test body. The test body common to force sensors 41, 42 is referenced 50 in FIG. 7, the other not being visible.

Figure 8:
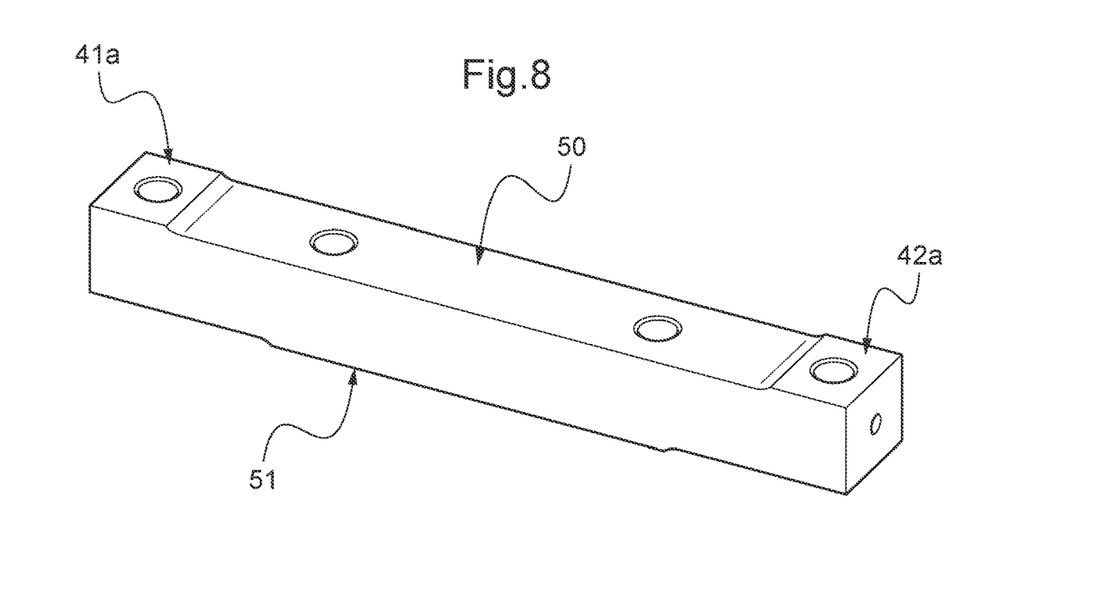
FIG. 8 shows a view of a dual force sensor used in the variant of FIG. 7.

FIG. 8 specifically illustrates test body 50 of force sensors 41, 42, it being noted that the one of force sensors 43, 44 is identical.

As can be seen, the flat surface of support interface 41a of force sensor 41 is located in a region of a first longitudinal end of the top face of the bar, while the flat surface of support interface 42a of force sensor 42 is located in a region of a second longitudinal end of the top face of the bar, the second longitudinal end being opposite to the first longitudinal end. In addition, the bar has a surface forming a mounting interface 51 on the underside of the bar for mounting the bar to horizontal support 22 of box 21. The bar also has holes for attachment to beam 32 of floor 31 of working platform 30 and to horizontal support 22 of box 21 of mast 20.

The operation is identical to the first embodiment. However, this variant is advantageous due to the relative positioning of support interfaces 41a, 42a provided by test body 50. As a result, upper surface 23 of horizontal support 22 can be machined less precisely, or not machined at all, compared to the case where each force sensor 41 to 44 has its own test body.

Figure 9:
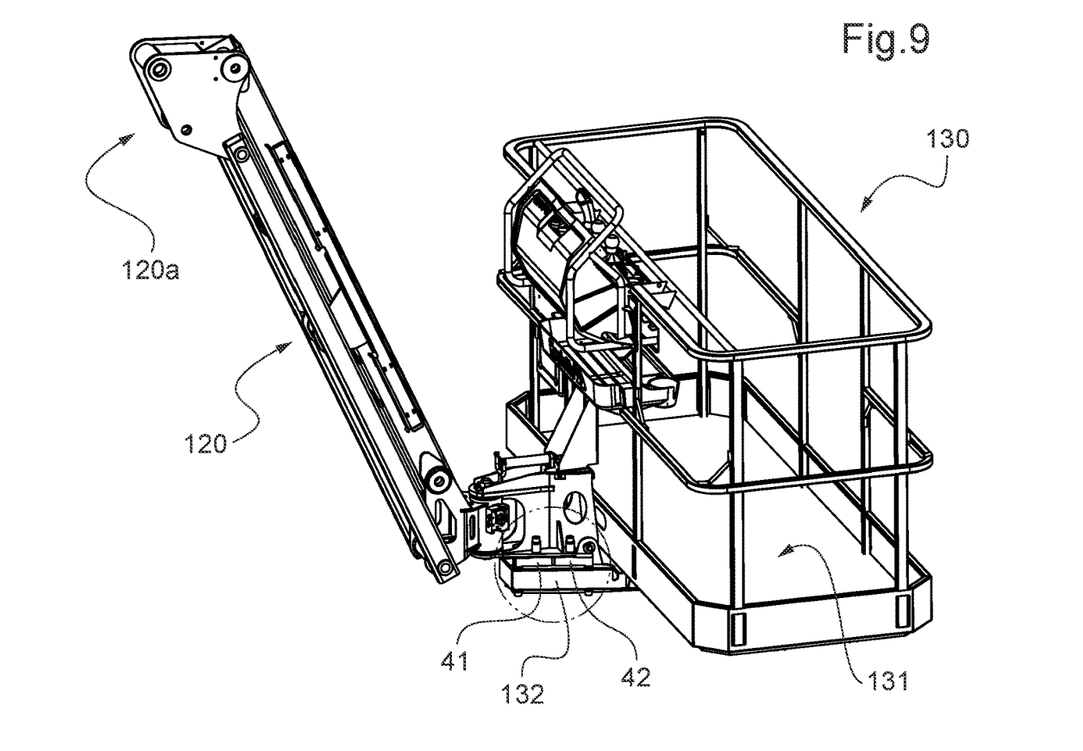
FIG. 9 shows a view of the pendulum arm and the working platform of an aerial work platform in a second embodiment in which the elevating structure comprises a pendulum arm mounted at one end to the upper end of the extensible mast and supporting the working platform at its other end.

FIG. 9 illustrates a second embodiment in which the aerial work platform is a telescopic mast aerial work platform. In this case, the angle of inclination of the mast—not shown—in relation to the aerial work platform chassis can be changed. The mast may also include sections that are articulated to each other around a horizontal axis so that they can be folded and unfolded. In this case, the aerial work platform comprises a pendulum arm 120 which is hinged at one end 120a to the upper end of the mast not shown. The other end of the pendulum arm 120 supports a working platform 131 from the middle of one long side of the working platform 130 via a weighing system that is similar to the first embodiment. Only force sensors 41, 42 are visible in FIG. 9. However, in contrast to the first embodiment, the force sensors are not placed under floor 131, but, seen in orthogonal projection on a plane corresponding to floor 131 of working platform 130, outside of floor 131. In this case, each lateral pair of force sensors is mounted on a common beam or a respective beam supporting floor 131 and extending out of floor 131 on the side towards the pendulum arm 120. The support interfaces of the force sensors can be placed, seen in orthogonal projection on a plane corresponding to floor 131, at the vertices of a rectangle or square as in the first embodiment. Alternatively, if each lateral pair of force sensors is placed on a respective beam extending obliquely to the long side of floor 131 instead of perpendicularly, and symmetrically to each other, then a placement of the support interfaces at the vertices of an isosceles trapezium in correspondence with the direction of extension of these two beams is advantageous from the point of view of the simplicity of mounting the force sensors on these beams. Apart from what has just been mentioned, all the rest of the description made of the first embodiment is applicable to the second embodiment.

Figure 10:
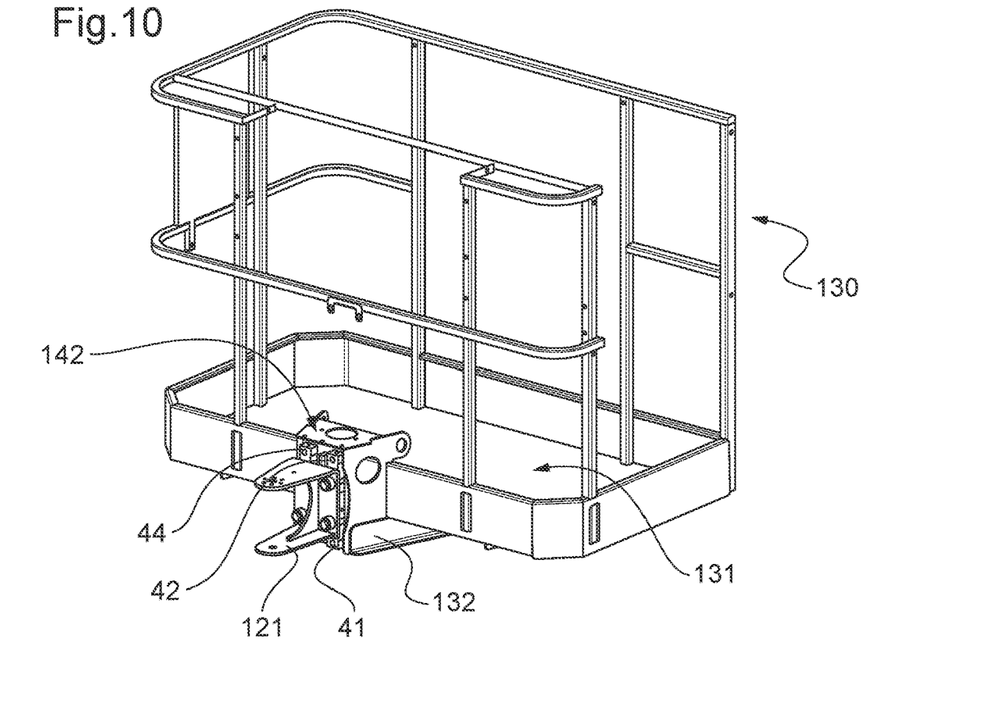
FIG. 10 shows a mounting variant of the force sensors compared to the mounting shown in FIG. 9.

FIG. 10 shows a third embodiment which differs from the second embodiment in FIG. 9 only by the installation of force sensors 41 to 44. Here, the bars of force sensors 41 to 44 extend perpendicularly to floor 131 instead of parallel to it as was the case in the first embodiment and in FIG. 9. Thus, the flat surfaces of the support interfaces of sensors 41 to 44 extend perpendicular to floor 131 instead of parallel to it. In other words, when floor 131 is in the horizontal position, the bars of force sensors 41 to 44, as well as the flat surfaces of their support interfaces, extend vertically instead of horizontally. Since the force sensors are mounted rearward of floor 131, outside of the latter, placing the bars perpendicular to floor 131 of working platform 130 advantageously saves space between working platform 130 and the end of the pendulum arm 120 which supports it.

Many variations are possible in the embodiments of FIGS. 9 and 10. According to a first variant, it can be an aerial work platform with a telescopic mast that can be tilted in relation to the aerial work platform chassis, but which does not have a pendulum arm 120. In other words, working platform 130 is supported directly by the upper end of the telescopic mast via the force sensors.

According to a second variant, the aerial work platform is an aerial work platform with a vertical fixed mast. As in the first embodiment, the vertical fixed mast is extensible by means of a plurality of boxes that fit together and slide vertically between them, and the mast supports the working platform via the upper box. But unlike the first embodiment, the elevating structure also includes pendulum arm 120, one end of which is articulated to the upper box of the vertical fixed mast and an opposite end supports working platform 130.

According to a third variant, each pair of force sensors share the same test body as in the case of the variant of FIGS. 7 and 8 described for the first embodiment.

More generally, the present invention is not limited to the examples and the embodiment described and represented, but numerous variants accessible to the person skilled in the art are possible.

For example, it is possible to use only three force sensors instead of four. For example, in the first embodiment, force sensors 42, 44 can be replaced by a single force sensor placed between a horizontal support arranged at the front of box 21 and a beam of the structure forming floor 31 of working platform 30. A similar approach can be envisaged for the other two embodiments. On the contrary, the use of more than four force sensors can also be considered. However, the use of four force sensors is preferred in terms of cost and quality of working platform hold.

Furthermore, if in the described embodiments, support interfaces 41a to 44a of force sensors 41 to 44 serve to support the working platform while mounting interfaces 42b or 50 serve to mount the force sensor on the elevating structure, their roles can be reversed. In other words, for one, several or all force sensors 41 to 44, it can be provided that the own support interface is used to support the sensor concerned by the elevating structure while its mounting interface 42b or 50 is used to mount the force sensor to the working platform.

The invention claimed is:

1. An aerial work platform, comprising:
   a working platform comprising a floor and a guardrail,
   an elevating structure adapted to move the working platform in height, the elevating structure comprising an extensible mast via which the working platform is supported, the elevating structure supporting the working platform only by one side of the working platform, and
   at least three force sensors interposed between the elevating structure and the working platform via which the elevating structure fully supports a weight of the working platform,
   wherein:
   the force sensors are arranged under the floor and in a fixed spatial relationship to each other,
   the force sensors are arranged so that, in orthogonal projection on a plane corresponding to the floor of the working platform, the force sensors are all located on a same side of a median line of the floor of the working platform which is the side located towards the one side of the working platform by which the working platform is supported by the elevating structure, and
   each of the force sensors is adapted to measure a load exerted on it only in a vertical direction by the working platform when the floor of the working platform extends horizontally.

2. An aerial work platform according to claim 1, wherein:
   the force sensors each have their own support interface through which they support the working platform or through which they are supported by the elevating structure, and
   each of the force sensors is adapted to measure the load exerted solely in the vertical direction by the working platform on its support interface when the floor of the working platform extends horizontally or to measure the load exerted solely in the vertical direction by its support interface on the elevating structure when the floor of the working platform extends horizontally.

3. An aerial work platform according to claim 2, wherein the force sensors are distributed in such a way that, in an orthogonal projection on a plane, the support interfaces occupy the vertices of a polygon.

4. An aerial work platform according to claim 2, wherein the elevating structure supports the working platform from the middle of one side of the working platform and the force sensors or the support interfaces of the force sensors are arranged symmetrically with respect to a median plane of the floor of the working platform which is perpendicular to said median line.

5. An aerial work platform according to claim 2, wherein the support interface of each force sensor comprises a planar support surface, the planar support surfaces of the support interfaces of the force sensors being coplanar.

6. An aerial work platform according to claim 2, wherein the support interface of each force sensor comprises a planar support surface extending parallel to the floor of the working platform.

7. An aerial work platform according to claim 2, wherein at least two of the force sensors are based on strain gauges arranged on or in a common test body, the support interface of each of these two sensors being part of the common test body.

8. An aerial work platform according to claim 7, wherein the common test body has a bar shape comprising two opposite longitudinal ends, the support interface of one of the two force sensors being arranged in a region towards one of the longitudinal ends and the support interface of the other of the two force sensors being arranged in a region towards the other longitudinal end.

9. An aerial work platform according to claim 2, wherein the force sensors are four in number, the supporting interfaces of the four force sensors being arranged, in orthogonal projection on a plane, along the vertices of a square, rectangle or isosceles trapezium.

10. An aerial work platform according to claim 9, wherein the force sensors are four in number and:
    two of the force sensors are based on strain gauges arranged on or in a common first bar-shaped test body, the support interface of each of these two sensors being part of the first bar-shaped test body, and
    the two other force sensors are based on strain gauges arranged on or in a common second bar-shaped test body separate from the first bar-shaped test body, the support interfaces of each of these two other sensors being part of the second bar-shaped test body.

11. An aerial work platform according to claim 1, wherein the extensible mast is a vertical fixed mast, the mast being extensible by means of a plurality of boxes which fit together and slide vertically between them, the mast supporting the working platform via an upper box to which the working platform is rigidly mounted by means of the force sensors.

12. An aerial work platform according to claim 11, wherein an upper part of the guardrail is in sliding contact against a vertical wall of the upper box to support the working platform.

13. An aerial work platform according to claim 11, wherein the upper box of the mast has supports projecting on at least two opposite sides of the upper box, the force sensors being fixed to said supports.

14. An aerial work platform according to claim 10, wherein the upper box of the mast has supports projecting on at least two opposite sides of the upper box, the first bar-shaped test body being fixed to one of the supports and the second bar-shaped test body being fixed to the other support.

15. An aerial work platform according to claim 14, wherein said supports are horizontal, the first and second bar-shaped test bodies being placed between the floor of the working platform and the corresponding horizontal support of the upper box by lying horizontally between them.

16. An aerial work platform according to claim 1, wherein the elevating structure supports the working platform by a narrow side of the working platform.

17. An aerial work platform according to claim 1, further comprising an electronic processing device for determining a load placed on the working platform from force measurements provided by the force sensors.

\* \* \* \* \*